United States Patent [19]

Kozol et al.

[11] Patent Number: 5,113,341

[45] Date of Patent: May 12, 1992

[54] TECHNIQUE FOR CREATING AND EXPANDING ELEMENT MARKS IN A STRUCTURED DOCUMENT

[75] Inventors: Michael Kozol, Gaithersburg; Chan Lim, Potomac; Willard L. Strong, Jr., Silver Spring; William Tracey, Germantown, all of Md.

[73] Assignee: International Business Machines Corporation, Armonk, N.Y.

[21] Appl. No.: 315,375

[22] Filed: Feb. 24, 1989

[51] Int. Cl.$^5$ ............................................. G06F 7/28
[52] U.S. Cl. ................................................ 364/419
[58] Field of Search ...................... 364/419, 200, 900

[56] References Cited

U.S. PATENT DOCUMENTS

| | | | |
|---|---|---|---|
| 4,393,463 | 7/1983 | Aiken, Jr. ............................ | 364/900 |
| 4,454,576 | 6/1984 | McInroy et al. ..................... | 364/200 |
| 4,481,603 | 11/1984 | McCaskill et al. .................. | 364/900 |
| 4,539,653 | 9/1985 | Bartlett et al. ...................... | 364/900 |
| 4,633,430 | 12/1986 | Cooper ............................... | 364/900 |
| 4,686,649 | 8/1987 | Rush et al. .......................... | 364/900 |
| 4,713,754 | 12/1987 | Agarwal et al. ..................... | 364/200 |
| 4,739,477 | 4/1988 | Barker et al. ....................... | 364/300 |
| 4,959,769 | 7/1990 | Cooper ............................... | 364/200 |
| 4,996,662 | 2/1991 | Cooper ............................... | 364/900 |
| 4,996,665 | 2/1991 | Nomura ............................. | 364/900 |

FOREIGN PATENT DOCUMENTS 3138734 9/1981 Fed. Rep. of Germany ............ 15/2

OTHER PUBLICATIONS

*IBM Technical Disclosure Bulletin*, entitled, "Conversion of Structured Documents for Filing", to Choy et al., vol. 31, No. 3, Aug. 1988, pp. 30–31.
*IBM Technical Disclosure Bulletin*, entitled, "GEDIT, A Generic-Markup Document Editor", to Bartlett et al., vol. 29, No. 9, Feb. 1987, pp. 3996–3998.
*IBM Technical Disclosure Bulletin*, entitled, "Page Marks for Page Composition in Document Processing Environments", to Edel et al., vol. 29, No. 9, Feb. 1987, pp. 3865–3868.
*IBM Technical Disclosure Bulletin*, entitled, "Generalized Markup Integrates Automatically Generated Reports with a Text Processing System", to Bailey and Bolton, vol. 22, No. 11, Apr. 1980, pp. 5129–5133.
*IBM Technical Disclosure Bulletin*, entitled, "Technique for Displaying the Hierarchical Structure of a Document", to Chamberlin, vol. 30, No. 6, Nov. 1987, pp. 340–342.

*Primary Examiner*—Dale M. Shaw
*Assistant Examiner*—Andrew Bodendorf
*Attorney, Agent, or Firm*—Jeffrey S. LaBaw

[57] ABSTRACT

A method for hierarchically expanding and contracting element marks in a structured document. The structured document is hierarchically organized, such as documents written in Standardized General Markup Language (SGML). An element consists of a begin tag and its associated content, and may optionally include an end tag. The editor can mark an element, to produce an element mark, to indicate its selection for document processing operations such as moving, copying or deleting the content of the element mark. The element mark can be hierarchically expanded to higher-level element marks by invoking the expand code as appropriate. The method also can be used to adjust a stream mark to an element mark.

18 Claims, 5 Drawing Sheets

FIG. 4A

TITLE FOR CHAPTER 1

This is the fir|st paragraph of the chapter
- Item 1 in unordered list
- Item 2 in unordered list This is the second paragraph of the chapter.

FIG. 4B

TITLE FOR CHAPTER 1

This is the fir|st paragraph of the chapter
- Item 1 in unordered list
- Item 2 in unordered list This is the second paragraph of the chapter.

FIG. 5A

TITLE FOR CHAPTER 1

This is the first paragraph of
the chapter
    o Item 1 in unordered list
    o Item 2 in un |ordered list
This is the second paragraph of
the chapter.

TITLE FOR CHAPTER 1

This is the first paragraph of
the chapter
    o Item 1 in unordered list
    o Item 2 in un |ordered list
This is the second paragraph of
the chapter.

FIG. 5B

TECHNIQUE FOR CREATING AND EXPANDING ELEMENT MARKS IN A STRUCTURED DOCUMENT

DESCRIPTION

1. Cross-Reference to Related Application

Commonly assigned U S. patent application Ser. No. 315,374, filed Feb. 24, 1989, entitled "A Technique for Contracting Element Marks in a Structured Document", and having Eric M. Hesse, Michael J. Kozol and Chan S. Lim as inventors.

2. Background of the Invention

This invention relates generally to document processing for a data processing system. More particularly, it relates to a method of marking elements of a hierarchical document structure, which may contain text, graphic, image or other data such as that defined by the Standard Generalized Markup Language (SGML), to allow a user to manipulate the logical structure of the elements of the document hierarchy with or without requiring the display of tags.

Many document editors have been developed for the processing and manipulation of conventional alphanumeric text, as well as of graphical or image data elements. WYSIWYG editors are based on the principle that the creator of a document should interact with a display which accurately represents how the document will appear when it is finally printed, otherwise known as the "What You See Is What You Get" (WYSIWYG) philosophy. This type of document editor is deemed particularly user friendly for unsophisticated users to obtain predictable results without a detailed understanding of the underlying document structure.

When manipulating portions of a document, it is often desirable to create a "mark" by visually altering, e.g., highlighting, reverse-video, changing color, etc. a portion of the document on a display to signify to the user which portion of the document he has selected for further processing operations. Many existing document processors allow a user to create a mark; most of these processors create a stream mark. A stream mark is a string of visually altered alphanumeric characters between two document positions which are defined by the user. A few existing word processors allow a user to mark a portion of text analagous to a single element in a structured document by visually altering, the string of alphanumeric characters which corresponds to a given set of formatting controls. However, the latter group of the prior art editors have no concept of marking a generic element.

In a structured or hierarchical document, all data resides in elements which are defined by a begin tag, its content, usually a string of alphanumeric characters, but possibly graphical or image data, and an end tag, if necessary. A number of lower-level elements typically comprise the next higher-level element; for example, several paragraph elements may make up a chapter element, and several chapter elements make up the entire document. However, in the case of a structured document, the tags which define the logical structure of the document cannot normally be displayed without compromising the WYSIWYG nature of the display. Without the display of the tag locations, it is more difficult for a user to mark complete elements and to perform subsequent editing operations, such as move, copy or delete, upon the entire element of a document. Even if the tags are displayed, i.e., in a non-WYSIWYG manner, it is quite tedious to mark an entire element where the element is large, e.g., a chapter element, where many screens of the document must be manually scrolled.

Moreover, no provision is made in the prior art for either hierarchically contracting a stream or element mark to a lower level element or hierarchically expanding a stream or element mark to a higher level element. Since the user does not necessarily understand where the beginning and end tags of an element are located, the ability to contract or expand the mark is very desirable.

SUMMARY OF THE INVENTION

It is therefore an object of the invention to hierarchically expand and contract element marks in a structured document.

It is another object of the invention to mark a generic element of any level within a structured document.

It is yet another object of the invention to display the element mark and its contraction or expansion without greatly compromising the WYSIWYG format of the display.

It is still another object of the invention to allow the user to expand and contract the element marks with a single user action.

These and other objects of the invention are accomplished by a technique which allows the user to create, expand or contract a new type of logical mark, an element mark, which is defined as a stream mark containing exactly one element. In the preferred embodiment, the technique is implemented by a set of programs for controlling a document processing system. The document processing system includes at least a central processing unit, a random access memory and a display. It preferably also includes a printer, a read-only memory, disk storage and I/O equipment. The random access memory stores the element mark code and the contract mark code which hierarchically expand or contract stream or element mark in a structured document respectively. The code determines whether a mark exists in the document, determines the current document position with respect to the mark, contracts or expands the mark as appropriate to the next level element and displays the altered mark to the user. If no error message is transmitted, the invention guarantees that a single element of the structured document is marked.

BRIEF DESCRIPTION OF THE FIGURES

The above and other objects, features and advantages of the invention will be more fully appreciated with reference to the accompanying figures.

FIG. 4 is a depiction of the appearance on a WYSIWYG display of a document which has undergone an expand element operation.

FIG. 5 is a depiction of the appearance on a WYSIWYG display of a document which has undergone a contract element operation.

DETAILED DESCRIPTION OF THE PREFERRED EMBODIMENT

The invention can be utilized in a distributed data processing system such as an IBM 3090 mainframe attached to a plurality of individual workstations. Alternatively, the invention can also be implemented in a stand alone processor such as a personal computer, for example an IBM PS/2 TM computer. In general, the invention can be implemented in any hardware configuration which includes the components described in the following illustrative embodiment.

Figure 1:
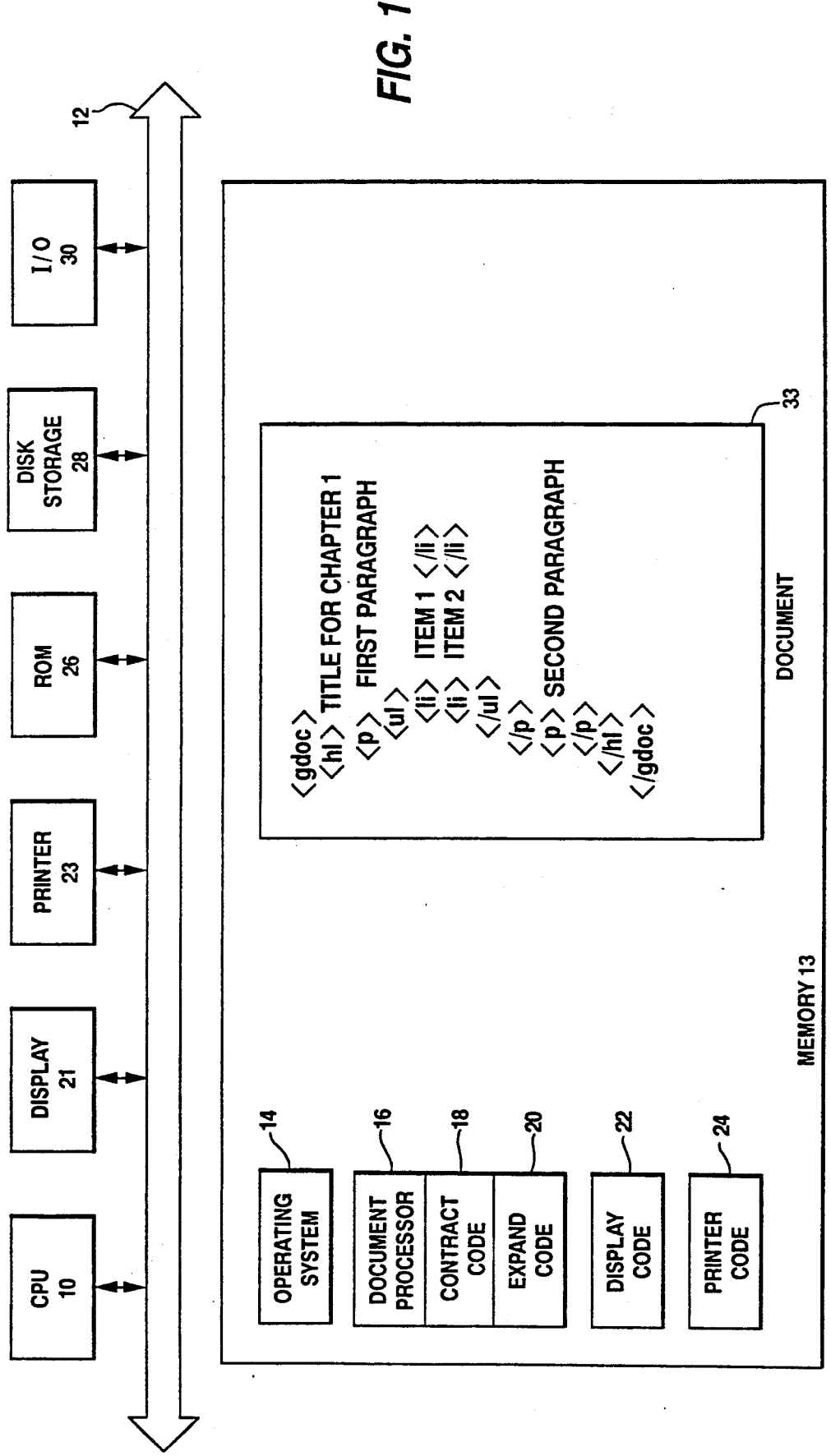
FIG. 1 is an architectural block diagram of a document processing system, depicting the memory having read therein a first document.

The preferred embodiment of the invention comprises a set of programs for controlling a document processing system as shown in FIG. 1. A central processing unit (CPU) 10 is connected via a system bus 12 to a random access memory 13. The random access memory 13 stores the set of program instructions in the form of code modules. Operating system functions are performed by the code in module 14, document processor functions are performed by the code in module 16. The code which hierarchically contracts and expands element marks is found in modules 18 and 20 respectively. In the preferred embodiment, code modules 18 and 20 are parts of the document processor code, however, they could be modules written separately for an existing document editor. The control of the WYSIWYG presentation of document processing to the display 21 is accomplished by the code in module 22. The final document is produced on the printer 23 by the use of the printer code in module 24. Also included in the document processing system of FIG. 1 is a read only memory 26, which contains fixed instructions which are executed by the CPU 10 to carry out elementary operations for the system. The disk storage 28 can permanently store code modules when they are not in use in RAM 13. The I/0 30 is connected to communication lines or other I/0 equipment for communication by the CPU 10 with external equipment.

Document 33 is read into memory 13, and is a hierarchically structured document, e.g., a document written in Standardized General Markup Language (SGML) which is defined by the International Standards Organization standard 8879-1986. While for purposes of illustration document 33 is composed entirely of text data, hierarchically defined documents can contain image, graphic, calendar, spreadsheet or audio elements as well. In FIG. 1, begin tags are enclosed by the "("and ")" symbols and end tags are enclosed by the "("and ")" symbols. For example, "(p)" and "(/p)" denote the begin paragraph and end paragraph tags respectively. The contents of document 33 are indented to emphasize its hierarchical structure. In a structured document, each element is ranked in a hierarchy, having a next higher-level, or parent, element and a next lower-level, or child, element in the document, except that the lowest level element within a particular branch of the hierarchy has no child element and the document element itself has no parent element. Also, an element may have a number of equal-level, or sibling, elements which together make up its parent element. For example, in FIG. 1, the first paragraph element is the parent element of the unordered list element, in turn, the chapter element is the parent element of the paragraph element and is comprised of two paragraph elements which are sibling elements. The unordered list element is the child element of the first paragraph element, and the list item elements are the child elements of the unordered list.

The list item elements and the second paragraph element have no child element as they are the lowest elements in their particular branch of the hierarchy.

Hierarchical expansion or contraction of an element mark occurs when the code adjusts the mark to mark the next level element from the currently marked element. As mentioned in the background section, the mark is generally displayed to the user by emphasizing the portion of text which corresponds to the boundaries of the mark, e.g., highlighting reverse video, changing color or otherwise visually altering the mark text with respect to the unmarked portions of the document. In the case of hierarchical expansion, the mark is adjusted, i.e., expanded to mark the parent element from the currently marked element; in hierarchical contraction, the mark is adjusted, i.e., contracted, to mark the child element. During editing operations, document 33 may be operated on by the code in modules 18 and 20 to create an element mark, or contract or expand the current mark to an element mark as desired by the user, as well as other editing operations provided by document processor code 16 or operating system code 14. Prior art document processors generally require a physical knowledge of the document being edited to create or adjust a mark. The user must move the cursor through the document to the beginning of the portion to be marked, invoke the mark function, then move the cursor through the document to the end of the portion and complete the mark function. The present invention allows the user to deal with the logical elements of the document, which is closer to the way in which most individuals conceive of a document. Rather than deciding to write ten lines of text about a given topic, one generally decides to write a paragraph; rather than twenty pages, one writes a chapter. Thus, in addition to being much faster than prior art methods of marking the present invention emulates the manner in which the human mind comprehends the structure of a document.

Mark Element

Figure 2:
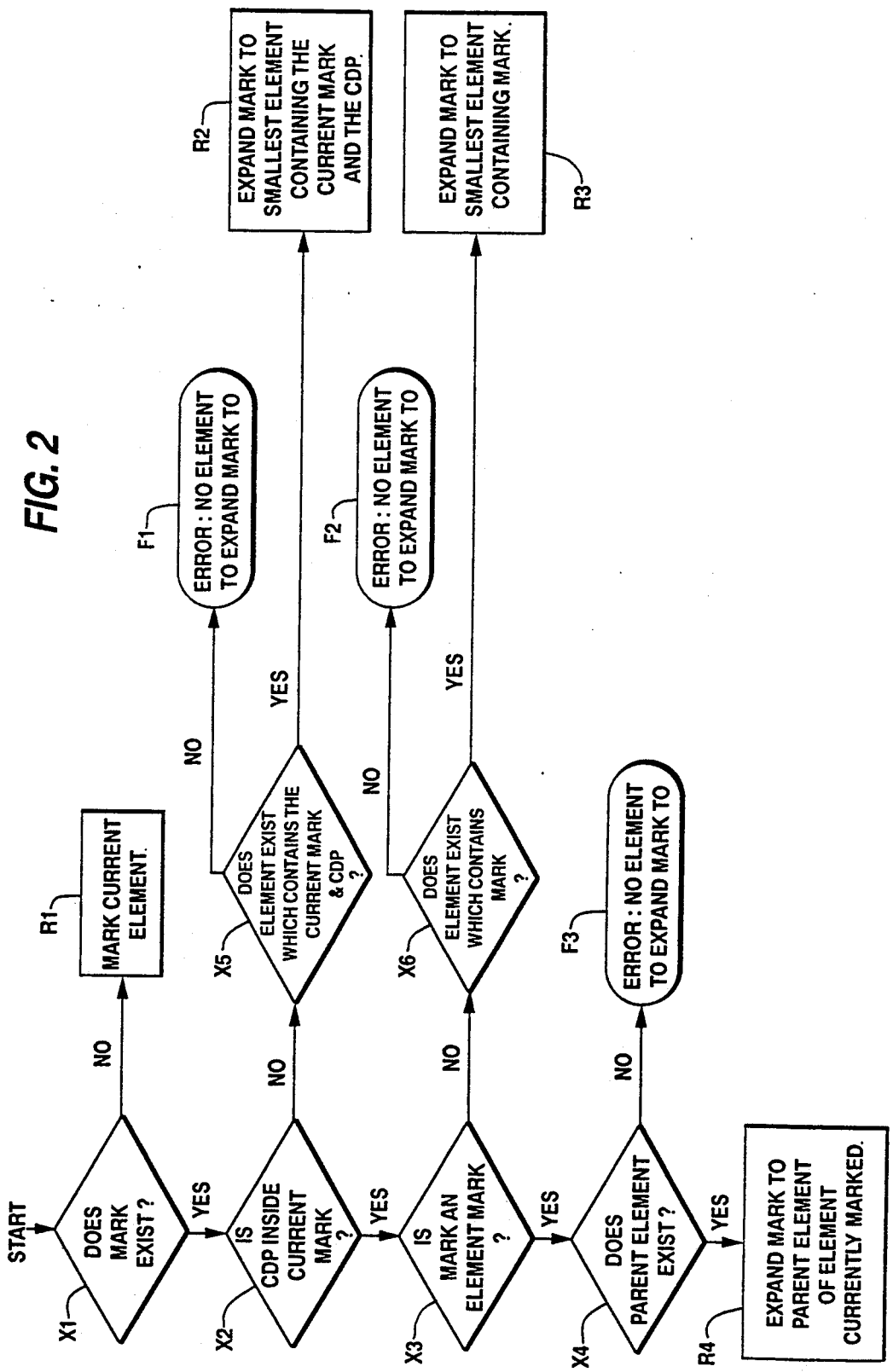
FIG. 2 is a flow diagram of the process for creating and hierarchically expanding an element mark.

FIG. 2 shows a flowchart of the preferred embodiment of mark element function 20. The code is used to create an element mark or expand a stream mark into an element mark. A user is currently editing a document on the text processor of FIG. 1 and invokes the mark element function 20 at the current document position, which corresponds visually to where the cursor is located. First, the code 20 determines whether a stream mark already exists (in box X1). If not, it creates an element mark highlighting the lowest-level element in which the current document position is located, box R1. If there is a stream mark already existing, the code 20 ascertains if the current document position is inside the stream mark, box X2. If not, it is determined whether an element exists which contains both the current mark and the current document position in box X5. If not, an error message F1 is generated; if so, the mark is expanded to the boundaries of smallest element which contains both the current mark and the current document position R2. If the current document position is inside the mark, the code 20 then checks to see whether the mark is an element mark in box X3, i.e., it begins and ends at a corresponding begin and end tag, or some other type of stream mark. If the mark is not an element mark, the mark element code 20 looks for an element which would contain the entire mark, if none exists, an error message F2 is generated. Otherwise, the mark is expanded to the boundaries of smallest element containing the mark R3. If the mark is an element mark, the code 20 determines whether there is a parent element to which the mark can be expanded in box X4. If not, an error message F3 is generated. If there is, the mark is expanded to the boundaries of parent element of the element currently marked R4.

After the element is marked, additional editing operations such as move, delete, copy, convert to uppercase, search, sort, put, cut, etc., provided by the document processor code 16 or the operating system 14 may be performed on the contents of the element mark. In a move or copy operation, the contents of the element mark may be moved or copied within the document 33, or to another document resident on the document processing system. The element mark can be adjusted by other conventional marking operations which expand or contract a mark based on document position rather than logical elements. In addition, further expansion of the mark to higher level elements is possible by reinvoking the mark element code 20.

To review, the mark element code 20 is used to create or expand a stream mark. The mark produced by this function will always mark a complete element. In other words, this function will always produce an element mark. The mark element code 20 can be invoked by a single user action, e.g., keystroke, mouse click, entry at a command line, panel selection, etc. Similarly, the code 20 does not change the current document position.

1. If no mark exists in a document—The current element is marked.
2. If a stream mark already exists in a document—This function can be used to adjust the mark in the following manner:
    a. If the current document position is located inside the current mark and the current mark is an element mark—The parent element of the element currently marked will be marked. This permits the hierarchical expansion of an element mark. If the outermost element of the document (root element) is already marked, an error is generated.
    b. If the current document position is inside the current mark and the current mark is not an element mark—The smallest element fully containing the current mark will be marked.
    c. If the current document position is outside the current mark—The smallest element which fully contains the current mark and the current document position will be marked.

Examples 1 through 5 illustrate the operation of the mark element code 20 on document 33.

The contents of the stream mark are highlighted. The current document position is represented by an asterisk "*". The begin tags are enclosed by "(" and ")" and the end tags are enclosed by "(/" and ")". In many cases, the end tags are not strictly necessary since the document processor can determine the boundaries of the element by semantics; however, they are included for sake of clarity.

EXAMPLE 1

Suppose the user begins editing the following document:

```
(gdoc)
    (h1)Title for Chapter 1
        (p)This is the first paragraph of the chapter.
        (ul)
            (li)*Item 1 in unordered list(/li)
```

-continued
```
            (li)Item 2 in unordered list(/li)
        (/ul)
    (/p)
    (p)This is the second paragraph of the chapter.(/p)
    (/h1)
(/gdoc)
```

The user invokes the Mark Element functoin. The following would result:

```
(gdoc)
    (h1)Title for Chapter 1
        (p)This is the first paragraph of the chapter.
        (ul)
            (li)*Item 1 in unordered list(/li)
            (li)Item 2 in unordered list(/li)
        (/ul)
    (/p)
    (p)This is the second paragraph of the chapter.(/p)
    (/h1)
(/gdoc)
```

The user invokes the Mark Element function again. The following would result:

```
(gdoc)
    (h1)Title for Chapter 1
        (p)This is the first paragraph of the chapter.
        (ul)
            (li)*Item 1 in unordered list(/li)
            (li)Item 2 in unordered list(/li)
        (/ul)
    (/p)
    (p)This is the second paragraph of the chapter.(/p)
    (/h1)
(/gdoc)
```

The user moves the cursor, resetting the current document position to the middle of the first paragraph of the chapter. The following would result:

```
(gdoc)
    (h1)Title for Chapter 1
        (p)This is the fir*st paragraph of the chapter.
        (ul)
            (li)Item 1 in unordered list(/li)
            (li)Item 2 in unordered list(/li)
        (/ul)
    (/p)
    (p)This is the second paragraph of the chapter.(/p)
    (/h1)
(/gdoc)
```

The user invokes the Mark Element function again. The following would result:

```
(gdoc)
    (h1)Title for Chapter 1
        (p)This is the fir*st paragraph of the chapter.
        (ul)
            (li)Item 1 in unordered list(/li)
            (li)Item 2 in unordered list(/li)
        (/ul)
    (/p)
    (p)This is the second paragraph of the chapter.(/p)
    (/h1)
(/gdoc)
```

EXAMPLE 2

Suppose the following document is currently being edited and that a non-element stream mark exists:

```
(gdoc)
    (h1)Title for Chapter 1
        (p)This is the fir*st paragraph of the chapter.
        (ul)
            (li)Item 1 in unordered list(/li)
            (li)Item 2 in unordered list(/li)
        (/ul)
        (/p)
        (p)This is the second paragraph of the chapter.(/p)
    (/h1)
(/gdoc)
```

The user invokes the Mark Element function. The following would result:

```
(gdoc)
    (h1)Title for Chapter 1
        (p)This is the fir*st paragraph of the chapter.
        (ul)
            (li)Item 1 in unordered list(/li)
            (li)Item 2 in unordered list(/li)
        (/ul)
        (/p)
        (p)This is the second paragraph of the chapter.(/p)
    (/h1)
(/gdoc)
```

EXAMPLE 3

Suppose the following document is currently being edited and that a non-element stream mark exists:

```
(gdoc)
    (h1)Title for Chap*ter 1
        (p)This is the first paragraph of the chapter.
        (ul)
            (li)Item 1 in unordered list(/li)
            (li)Item 2 in unordered list(/li)
        (/ul)
        (/p)
        (p)This is the second paragraph of the chapter.(/p)
    (/h1)
(/gdoc)
```

The user invokes the Mark Element function. The following would result:

```
(gdoc)
    (h1)Title for Chap*ter 1
        (p)This is the first paragraph of the chapter.
        (ul)
            (li)Item 1 in unordered list(/li)
            (li)Item 2 in unordered list(/li)
        (/ul)
        (/p)
        (p)This is the second paragraph of the chapter.(/p)
    (/h1)
(/gdoc)
```

EXAMPLE 4

Suppose the following document is currently being edited and that a non-element stream mark exists:

```
(gdoc)
    (h1)Title for Chapter 1
        (p)This is the first paragraph of the chapter.
        (ul)
            (li)Item 1 in unordered list(/li)
            (li)Item 2 in u*nordered list(/li)
        (/ul)
        (/p)
        (p)This is the second paragraph of the chapter.(/p)
    (/h1)
(/gdoc)
```

The user invokes the Mark Element function. The following would result:

```
(gdoc)
    (h1)Title for Chapter 1
        (p)This is the first paragraph of the chapter.
        (ul)
            (li)Item 1 in unordered list(/li)
            (li)Item 2 in u*nordered list(/li)
        (/ul)
        (/p)
        (p)This is the second paragraph of the chapter.(/p)
    (/h1)
(/gdoc)
```

EXAMPLE 5

Suppose the user begins editing the following document and an element mark exists on the entire document:

```
(gdoc)
    (h1)Title for Chapter 1
        (p)This is the first paragraph of the chapter.
        (ul)
            (li)*Item 1 in unordered list(/li)
            (li)Item 2 in unordered list(/li)
        (/ul)
        (/p)
        (p)This is the second paragraph of the chapter.(/p)
    (/h1)
(/gdoc)
```

If the user invokes the Mark Element function, an error will be generated because the outermost element (root element) of the document is already marked.

Contract Mark

Figure 3:
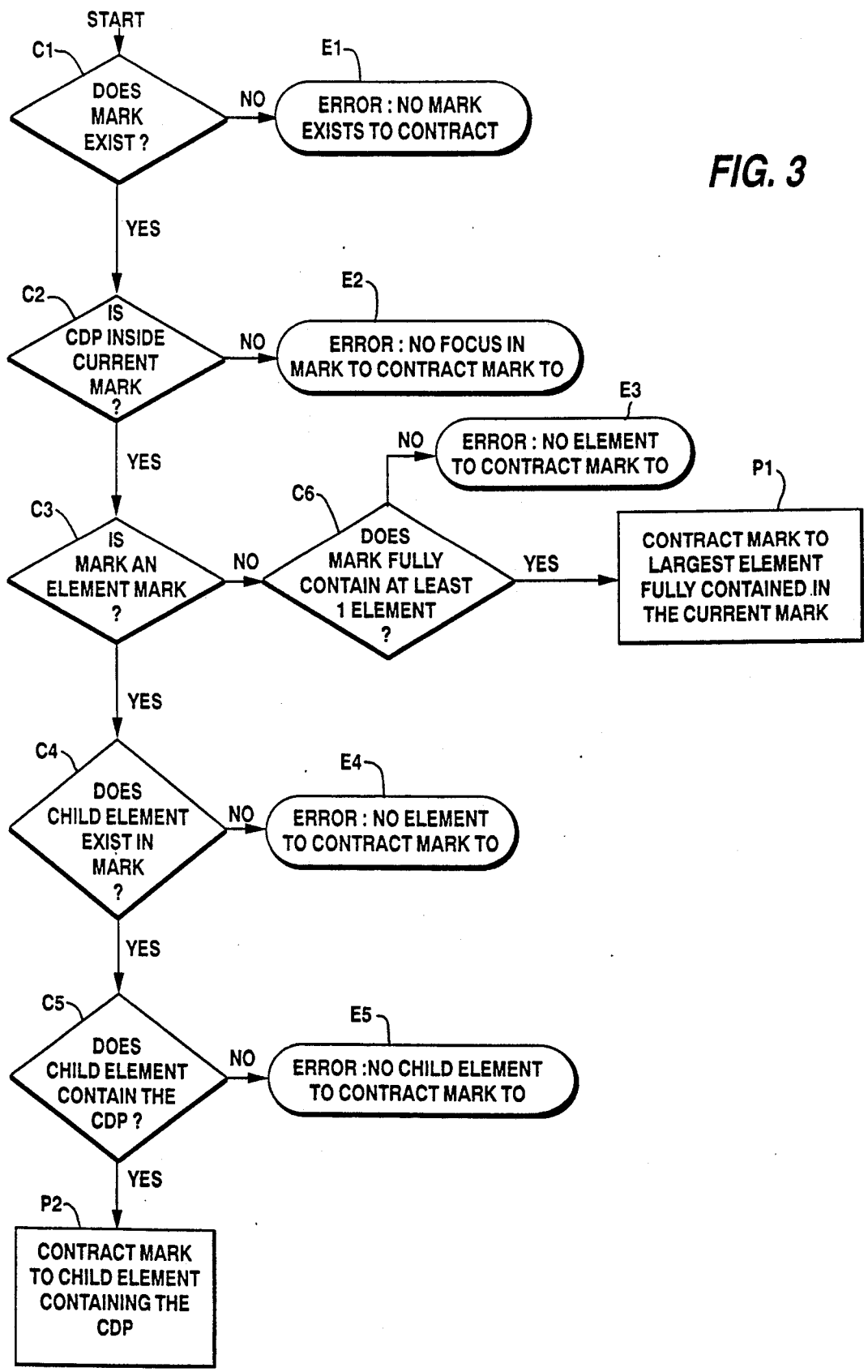
FIG. 3 is a flow diagram of the process for hierarchically contracting an element mark.

FIG. 3 shows a flowchart of the preferred embodiment of the contract mark function 18. The user is currently editing a document on the text processing system of FIG. 1 and elects to invoke the contract mark function 18 at the current document position depicted on the display 21 by the cursor. First, the contract mark code 18 checks to see if there is a mark available to contract in box C1. If not, an error message E1 is generated indicating to the user that no mark currently exists. If a mark is present, the contract mark code next determines whether the current document position is within the mark, in box C2. If not, a second error message E2 is generated informing the user he must move the cursor within a mark to proceed. Next, in box C3, the code 18 checks to see if the highlighted mark is an element mark. If the mark is not an boundaries of the element mark, the code will attempt to contract the mark to the largest element fully contained in the current mark box C6. If no complete element mark exists within the current mark, an error message E3 is generated. If the mark is an element mark, the contract mark code 18 determines whether a child element exists completely within the current element mark box C4. If not an error message E4 is generated. Next, in box C5, the code ascertains if the current document position is within a boundaries of the child element. If not, an error message E5 is generated. If so, the code 18 contracts the mark to the child element containing the current document position. After the element is marked, additional editing operations provided by the document processor code 16 or the operating system 14 may be performed on the contents of the element mark. In addition, further contraction of the mark to lower-level elements is possible by reinvoking the contract mark code 18.

To review, the contract mark function will contract a stream or element mark. The stream mark produced by the code 18 will always mark a complete element. In other words, an element mark is always produced when this function is successfully completed. Otherwise, an error is generated. Like the mark element 20, the contract mark code can be invoked by a single user action, e.g., a keystroke, mouse click, entry at a command line, panel selection, etc. In addition, the current document position is not changed.

1. If no mark exists: An error is generated.
2. If a stream mark already exists in a document - This function can be used to adjust the mark in the following manner:
   a. If current document position is inside the current mark and the current mark is an element mark—The mark is contracted from the current element to the child element which contains the current document position. This permits the hierarchical contraction of an element mark. If no child elements exist or if no child element contains the current document position, an error is generated.
   b. If the current document position is inside the current mark and the current mark is not an element mark—The mark is contracted to the largest element which contains the current document position and is fully contained within the current mark. If the smallest possible element containing the current document position is not fully contained within the current mark, the mark is not contracted and an error is generated.
   c. If the current document position is outside the current mark—An error is generated.

Examples 6 through 11 will illustrate the operation of the contract mark code 18 on document 33. The examples share the same notation used in Examples 1 through 5 above.

EXAMPLE 6

Suppose the following document is currently being edited:

```
(gdoc)
   (h1)Title for Chapter 1
      (p)This is the first paragraph of the chapter.
      (ul)
         (li)Item 1 in unordered list(/li)
         (li)Item 2 in un*ordered list(/li)
      (/ul)
      (/p)
      (p)This is the second paragraph of the chapter.(/p)
   (/h1)
(/gdoc)
```

If the user invokes the Contract Mark function, an error is generated because no mark currently exists in the document.

EXAMPLE 7

Suppose the following document is currently being edited and an element mark exists on the unordered list:

```
(gdoc)
   (h1)Title for Chapter 1
      (p)This is the first paragraph of the chapter.
      (ul)
         (li)Item 1 in unordered list(/li)
         (li)Item 2 in un*ordered list(/li)
      (/ul)
      (/p)
      (p)This is the second paragraph of the chapter.(/p)
   (/h1)
(/gdoc)
```

The user invokes the Contract Mark function. The following would result:

```
(gdoc)
   (h1)Title for Chapter 1
      (p)This is the first paragraph of the chapter.
      (ul)
         (li)Item 1 in unordered list(/li)
         (li)Item 2 in un*ordered list(/li)
      (/ul)
      (/p)
      (p)This is the second paragraph of the chapter.(/p)
   (/h1)
(/gdoc)
```

If the user invokes the Contract Mark function again, an error would be generated because the element currently marked has no child element.

EXAMPLE 8

Suppose the following document is currently being edited and an element mark exists on the unordered list (gdoc)

```
(gdoc)
   (h1)Title for Chapter 1
      (p)This is the first paragraph of the chapter.
      (ul)
         (li)Item 1 in unordered list(/li)*
         (li)Item 2 in unordered list(/li)
      (/ul)
      (/p)
      (p)This is the second paragraph of the chapter.(/p)
   (/h1)
(/gdoc)
```

If the user invokes the Contract Mark function, an error would be generated because no chile element of the element currently marked contains the current document position.

EXAMPLE 9

Suppose the following document is currently being edited and that a non-element stream mark exists:

```
(gdoc)
   (h1)Title for Chapter 1
      (p)This is the first paragraph of the chapter.
      (ul)
         (li)Item 1 in unordered list(/li)
```

```
            (li)Item 2 in unord*ered list(/li)
         (/ul)
      (/p)
      (p)This is the second paragraph of the chapter.(/p)
   (/hl)
(/gdoc)
``` the user invokes the Contract Mark function. The following would result:

```
(gdoc)
   (h1)Title for Chapter 1
      (p)This is the first paragraph of the chapter.
         (ul)
            (li)Item 1 in unordered list(/li)
            (li)Item 2 in unord*ered list(/li)
         (/ul)
      (/p)
      (p)This is the second paragraph of the chapter.(/p)
   (/hl)
(/gdoc)
```

EXAMPLE 10

Suppose the following document is currently being edited and that a non-element stream mark exists:

```
(gdoc)
   (h1)Title for Chapter 1
      (p)This is the first paragraph of the chapter.
         (ul)
            (li)Item 1 in unord*ered list(/li)
            (li)Item 2 in unordered list(/li)
         (/ul)
      (/p)
      (p)This is the second paragraph of the chapter.(/p)
   (/hl)
(/gdoc)
```

If the user invokes the Contract Mark function, an error would be generated because the smallest possible element containing the current document position is not fully contained within the current mark.

EXAMPLE 11

Suppose the following document is currently being edited and that a stream mark exists in the document:

```
(gdoc)
   (h1)Title fo*r Chapter 1
      (p)This is the first paragraph of the chapter.
         (ul)
            (li)Item 1 in unordered list(/li)
            (li)Item 2 in unordered list(/li)
         (/ul)
      (/p)
      (p)This is the second paragraph of the chapter.(/p)
   (/hl)
(/gdoc)
```

If the user invokes the Contract Mark function, an error is generated because the current document position is not contained within the mark.

Examples 1 through 11 were depicted in indented format showing the beginning and end tags of the various elements of document 33 for the sake of understanding. None of this detail would be available to the user on a WYSIWYG display. The change to the mark caused by the mark element code 20 in Example 2 above is shown in FIG. 4. Note that none of the stages are visible, and only the amount of highlighting is changed. The change to the mark caused by the contract mark code 18 in Example 7 above is shown in FIG. 5 as displayed to the user. FIGS. 4 and 5 also depict and discuss the current document position which is equivalent to the document position displayed by the cursor, the current element which is the element which contains the current document position and the current mark which is the portion of the structured document currently highlighted for possible editing operations.

In the preferred embodiment, the mark element code and contract mark code function on somewhat different principles. The mark element code operates on the document with respect to two focal points: the current document position and the current mark. It will function if the current document position is within or outside the current mark, and will produce an element mark if no mark currently exists in the document. In contrast, the contract mark code has but one focal point which must be the current document position inside the current mark. If the current document position is outside the current mark, or no mark currently exists in the document, the contract mark code will generate an error.

Purists might maintain that even highlighting is disallowed in a WYSIWYG display, as the highlighting will not be printed in the final document. For the purposes of the specification and the appended claims, a representation which displays only a highlighted or otherwise emphasized mark without the display of tags or other formatting commands is considered WYSIWYG. While the description above has generally been characterized in terms of a WYSIWYG representation of a structured document, the present invention is also useful where the tags of the document are displayed. Primarily, it is superior to the prior art since the complete and reliable marking of a single element can be accomplished by a single user action. The prior art marking operations required at least two manual actions in combination with whatever necessary scrolling resulted in uncertain reliability as to whether a complete element would be marked.

While the invention has been described with respect to a particular preferred embodiment, it would be understood by those skilled in the art that modifications may be made without departing from the spirit and the scope of the present invention. For example, the mark element command could be incorporated into a batch exec program in which all elements of a certain type within a structured document are to be subject to an additional editing operation without display of the marked elements to the user. Also, the preferred embodiments above utilize the current document position as the reference point about which the mark is hierarchically expanded or contracted. The invention also envisions a method where a reference point is left at a selected document position by a single user action, and the expand or contract function is invoked from a command line. The embodiments presented above are for purposes of example and illustration only and are not to be taken to limit the scope of the appended claims.

We claim:

1. In a document processing system including a central processing unit, a random access memory and a display device, a method for hierarchically expanding a stream mark to an element mark about a reference point, in a structured document, in said random access memory in a database form, comprising the steps of:

determining whether said reference point is inside an element which also contains all of said structured document contained in said stream mark;

expanding said stream mark to mark a smallest element containing said reference point and said corresponding portion of said structured document to produce an element mark; and displaying said structured document on said display device emphasizing said element mark.

2. The method is recited in claim 1, wherein said reference point is a device current document position which is represented by a cursor displayed on said display.

3. The method as recited in claim 1, wherein said structured document is in SGML format.

4. The method as recited in claim 1, wherein said method is invoked by a single user action.

5. The method as recited i claim 1, which further comprises the step an additional editing operation on the contents of said element mark.

6. The method as recited in claim 1, wherein said structured document is displayed to the user in a WYSIWYG representation.

7. The method as recited in claim 2, which further comprises the steps of:

expanding said element mark to a second smallest element containing the current document position and said smallest element to produce a parent element mark; and displaying said structured document ons aid display device emphasizing said parent element mark.

8. The method as recited in claim 2, which further comprises the steps of:

moving the current document position within said structured document;

determining whether the current document position is inside a second smallest element which also contains all of said smallest element;

expanding said element mark to a second smallest element containing the current document position and said smallest element to produce a higher level mark; and displaying said structured document on said display device emphasizing said higher level mark.

9. In a document processing system including a central processing unit, a random access memory device and a display device, a method for hierarchically expanding an element mark which marks an element about a reference point in a structured document in said random access memory in database form, comprising the steps of:

determining whether said reference point is inside said element mark;

expanding said element mark to a parent element of said element to produce a parent element mark; and displaying said structured document on said display device emphasizing said parent element mark.

10. The method as recited in claim 9, wherein said reference point is the current document position.

11. The method as recited in claim 9, wherein said structured document is in SGML format.

12. The method as recited in claim 9, wherein said method is invoked by a single user action.

13. The method as recited in claim 9, which further comprises the step of an additional editing operation on said parent element.

14. The method as recited in claim 9, wherein said structured document is displayed to the suer i a WYSIWYG representation.

15. The method as recited in claim 9, which further comprises the step of:

expanding said parent mark to a parent element of said parent element to produce a grandparent element mark;

and displaying said structured document on said display device emphasizing said grandparent element mark.

16. The method as recited in claim 9, which further comprises the steps of:

moving said reference point within said structured document;

determining a smallest higher level element which contains said reference point and said parent element;

expanding said parent element mark to the smallest higher level element containing the current document position and said parent element to produce a higher level element mark; and, displaying said structured document on said display device emphasizing said higher level element mark.

17. A document processing system capable of hierarchically expanding a stream mark to an element mark about a reference point in a presentation of a structured document comprising:

an expand code module which contains instructions to determine the document position of a reference point, determine the existence of said stream mark, and hierarchically expand said stream mark to a smallest higher-level element containing both said reference point and said stream mark;

a display device for displaying a representation of said structured document, said stream mark and said element mark to a suer;

a random access memory which provides a temporary storage for said expand code and a database representation of said structured document; and a central processing unit for controlling and coupled to said display device and said random access memory which when executing commands within said expand code module;

determines a document position of a reference point in said structured document;

determines whether said document position is inside an element which also contains all of said structured document which corresponds to said stream mark; and, expands said stream mark to mark a smallest element containing said document position and said corresponding portion of said structured document to produce an element mark.

18. The document processing system as recited in claim 17, which further comprises:

a printer for producing a hard copy of said structured document coupled to said central processing unit;

a read only memory for storing fixed operation instructions coupled to and executed by said central processing unit; and disk storage for permanent storage of said expand code modules coupled to said central processing unit.

* * * * *